Patented Feb. 21, 1928.

1,659,907

UNITED STATES PATENT OFFICE.

CHARLES BOGIN, OF TERRE HAUTE, INDIANA, ASSIGNOR TO COMMERCIAL SOLVENTS CORPORATION, OF TERRE HAUTE, INDIANA, A CORPORATION OF MARYLAND.

DIBUTYL MESOTARTRATE.

No Drawing.   Application filed January 26, 1927.   Serial No. 163,843.

My present invention relates to a new composition of matter comprising the normal dibutyl ester of mesotartaric acid, which substance is hereinafter described as dibutyl mesotartrate. This compound is believed to have the following structural formula:—

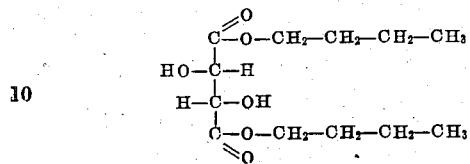

Dibutyl mesotartrate is a white crystalline solid which melts at 48–50° C. It boils at about 205° C. under 20 millimeters pressure. It is neutral to methyl orange and is soluble in water to the extent of about 2%. It is a good solvent for nitrocellulose and is miscible with organic liquids such as aliphatic esters, ketones, alcohols, etc.

Dibutyl mesotartrate may be readily prepared by ordinary esterification technique, using normal butyl alcohol and mesotartaric acid as the raw materials. When butyl alcohol and mesotartaric acid are mixed in molecular proportions and the mixture heated and contacted with hydrochloric acid gas as a catalyst, a yield of dibutyl mesotartrate amounting to about 90% of the theoretical may readily be obtained.

On account of its low rate of volatility and its solvent action on nitrocellulose, dibutyl mesotartrate may be employed to advantage as a plasticizer in lacquers, films, and plastic masses. The use of dibutyl mesotartrate as a plasticizer has been claimed by me in U. S. patent application, Serial Number 50,259, filed August 14th, 1925; and such use forms no part of the present invention.

Now having described my invention, I claim the following as new and novel:—

1. As a new composition of matter, the normal dibutyl ester of mesotartaric acid.

2. As a new composition of matter, the neutral dibutyl ester of mesotartaric acid, a white crystalline solid melting at 48–50° C.

3. A composition of matter comprising a dibutyl ester of mesotartaric acid, whose molecular structure is expressed by the following formula:—

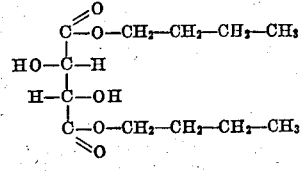

In testimony whereof I affix my signature.

CHARLES BOGIN.